(12) United States Patent
Cho et al.

(10) Patent No.: US 12,465,661 B2
(45) Date of Patent: Nov. 11, 2025

(54) HOOK FOR A VOLATILE COMPOSITION DISPENSER

(71) Applicant: The Procter & Gamble Company, Cincinnati, OH (US)

(72) Inventors: Mei San Gigi Cho, Singapore (SG); Bhavesh Rajwani, Singapore (SG); Sijing Yao, Foshan Guangdong (CN); Jiahao Ye, Shenzhen Guangdong (CN)

(73) Assignee: The Procter & Gamble Company, Cincinnati, OH (US)

( * ) Notice: Subject to any disclaimer, the term of this patent is extended or adjusted under 35 U.S.C. 154(b) by 289 days.

(21) Appl. No.: 17/860,134

(22) Filed: Jul. 8, 2022

(65) Prior Publication Data

US 2023/0009010 A1 Jan. 12, 2023

(30) Foreign Application Priority Data

Jul. 9, 2021 (WO) ................ PCT/CN2021/105433

(51) Int. Cl.
*A61L 9/12* (2006.01)
(52) U.S. Cl.
CPC .............. *A61L 9/12* (2013.01); *A61L 2209/15* (2013.01)
(58) Field of Classification Search
CPC ............................... A61L 9/12; A61L 2209/15
USPC ...................................................... 239/34, 57
See application file for complete search history.

(56) References Cited

U.S. PATENT DOCUMENTS

| | | | |
|---|---|---|---|
| 927,062 A | 7/1909 | Monnot | |
| 1,863,511 A * | 6/1932 | Travis | ................ A01M 1/2055 239/57 |
| 4,512,481 A | 4/1985 | Thalenfeld | |
| 4,951,855 A * | 8/1990 | Jacobson | ............... A47G 25/28 223/92 |
| 6,126,049 A * | 10/2000 | Gish | .................... A47G 25/487 223/98 |
| 6,149,038 A | 11/2000 | Tsai | |
| 7,111,794 B2 | 9/2006 | Timpson | |

(Continued)

FOREIGN PATENT DOCUMENTS

| | | |
|---|---|---|
| CN | 201551613 U | 8/2010 |
| EP | 0696544 A1 | 2/1996 |

(Continued)

OTHER PUBLICATIONS

"Fuller Brush Co Deluxe Hang-Up Case Mothball Closet Deodorant Victorian Cameo Jane Austen Style Cottage Core", Retrieved From https://www.etsy.com/hk-en/listing/856992016/fuller-brush-co-deluxe-hang-up-case?ga_order=most_relevant&ga_search_type=all&ga_view_type=gallery&ga_search_query=moth+ball+holder&ref=sr_gallery-1-3&cns=1, Date Unknown, 16 Pages.

(Continued)

*Primary Examiner* — Christopher S Kim
(74) *Attorney, Agent, or Firm* — Elizabeth A. Conklin (57) ABSTRACT

A hook for a volatile composition dispenser. The hook has a mounting portion for mounting the hook to a support in an interior space, and a body portion extending from the mounting portion. The body portion has a gripping portion and an aperture engaging portion adapted for releasably engaging at least one aperture in a housing of the dispenser. The body portion is characterized by a first width W1 at the gripping portion and a second width W2 at the aperture engaging portion, wherein a ratio of the first width W1 to the second width W2 is greater than 1.5:1.

16 Claims, 6 Drawing Sheets

(56) References Cited

U.S. PATENT DOCUMENTS

| | | |
|---|---|---|
| 9,644,359 B2 | 5/2017 | Burt et al. |
| 2005/0156097 A1 | 7/2005 | Tatarsky et al. |
| 2009/0020625 A1 | 1/2009 | Trevino |
| 2014/0239079 A1 | 8/2014 | Wolf |
| 2018/0229893 A1 | 8/2018 | Levin et al. |

FOREIGN PATENT DOCUMENTS

| | | |
|---|---|---|
| GB | 2406054 A | 3/2005 |
| JP | S62125280 U | 8/1987 |
| JP | H0826290 A | 1/1996 |
| JP | 2005239261 A | 9/2005 |
| JP | 2010273630 A | 12/2010 |
| JP | 2014051315 A | 3/2014 |
| JP | 2015009819 A | 1/2015 |
| JP | 6155369 B2 | 6/2017 |
| KR | 20180102849 A | 9/2018 |
| WO | 2010121039 A2 | 10/2010 |

OTHER PUBLICATIONS

PCT Search Report and Written Opinion for PCT/CN2021/105433 dated Jan. 7, 2022, 13 pages.

* cited by examiner

HOOK FOR A VOLATILE COMPOSITION DISPENSER

FIELD OF THE INVENTION

The present invention relates to devices and systems for delivering a volatile composition for air freshening and/or providing a benefit, and particularly to a hook for a volatile composition dispenser and a volatile composition dispensing system.

BACKGROUND OF THE INVENTION

It is well known that an air freshening device may be used to provide a pleasant scent or other emanated material for olfactory sensing within a room of a home, office or other interior environment. Typically, such devices perpetuate a volatile composition, e.g., fragrance, odor masker, medicine, disinfectant, deodorizer, insect repellent, aromatherapy material, vaporized medication or other volatile composition by either an energized or non-energized means. The devices may be placed on an interior space in an interior environment. However, consumers may prefer portable devices that can be installed quickly and removed quickly from interior spaces. Specifically, for freshening an interior space, consumers may place air freshener devices with outer configurations that fit in a living space or configurations within storage spaces such as cupboards, wardrobes, shoe cabinets, and can be removed to replace the devices when finished. However, in interior spaces with limited surfaces for placing standing air fresheners, consumers may prefer to attach the air freshener to a fitting in interior spaces. The fitting may include but is not limited to curtain rails, rods in wardrobes, closet louvres/openings, vehicle vents, towel railings and/or hanging supports or wall hooks in bathrooms.

JP Patent Publication No. JP6155369B2 ("JP6155369B2") describes a hook for hanging a container of a drug volatilizer though a hanging hole of the container. JP6155369B2 describes a hook having a holding member with two inclined surfaces to facilitate insertion of a projecting member of the hook to an opening of the container. The hook may be removed with assistance by a tool such as by inserting a physical part into a gap of the hook to widen the gap so that the hanging hole of the container is detached from the projecting member. Although JP6155369B2 also proposes an alternative design of a tear-away hook to detach the hook from the volatilizer without assistance, such alternative design results in a hook that cannot be reused.

U.S. Pat. No. 9,272,062B1 describes a combination air freshener and ornament formed of one or more polymer resin(s) loaded with a fragrance oil and having a hanging hook that serves a dual function of a hanging hook when the ornament is in a hanging configuration and as a support stand when the ornament is in a standing display configuration. The ornament has a receiving hole formed in a top surface of the ornament and the hanging hook is force-fit with the receiving hole. A potential disadvantage is the hanging hook may be dislodged easily from the ornament.

Therefore, there still exists a need for a hook that is capable of being releasably attached to an aperture of a volatile composition dispenser to support a volatile composition dispenser having a volatile composition (liquid, solid or gel) in a hanging configuration, and is capable of being detached easily in a single hand action.

SUMMARY OF THE INVENTION

The present invention relates to a hook for a volatile composition dispenser, the hook comprising:

a mounting portion for mounting the hook to a support in an interior space;

a body portion extending from the mounting portion; wherein the body portion comprises a gripping portion and an aperture engaging portion adapted for releasably engaging at least one aperture in a housing of the dispenser;

wherein the body portion is characterized by a first width W1 at the gripping portion and a second width W2 at the aperture engaging portion, wherein a ratio of the first width W1 to the second width W2 is greater than 1.5:1.

DETAILED DESCRIPTION OF THE INVENTION

It has been found that the design of parts making up a hook play an important role in enabling ease of attaching and releasing the hook from a volatile composition dispenser for supporting the volatile composition above a surface in an interior space and providing a reusable hook at the same time. In particular, providing a hook with a body portion having a gripping portion and an aperture engaging portion adapted for releasably engaging at least one aperture in a housing of the dispenser; wherein the body portion is characterized by a first width W1 at the gripping portion and a second width W2 at the aperture engaging portion, wherein a ratio of the first width W1 to the second width W2 is greater than 1:1 or greater than 1.5:1, provides ease of releasing the hook from the at least one aperture.

Figure 2:
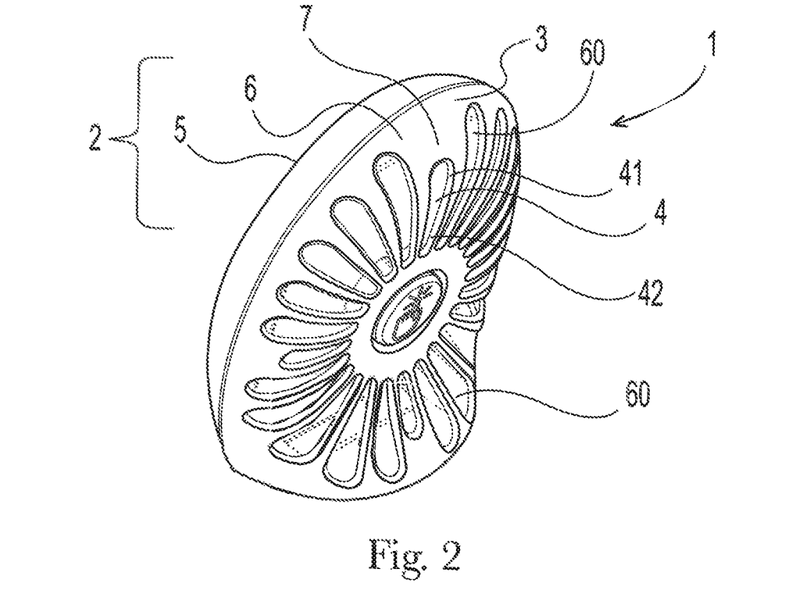
FIG. 2 is a rear perspective view of a volatile composition dispenser for use with the hook of FIG. 1.

The present invention relates to a hook for a volatile composition dispenser, a volatile composition dispensing system and a method of delivering a volatile composition in an interior space. The hook is suitable for various uses, including but not limited to, supporting a volatile composition dispenser having a volatile composition, such as a perfumed air freshening composition, in a liquid state, a solid state or a gel state. The hook may be attached to a housing or a container of a volatile composition dispenser having at least one aperture to form a volatile composition dispensing system. The following description referring to the figures is intended to provide non-limiting examples of the present invention. For the purposes of this disclosure, but without intending to limit the scope of the invention, the hook is designed for releasable attachment to a volatile composition dispenser having a housing of an irregular shape such as shown in FIG. 2. However, the hook may be configured to be attached to a volatile composition dispenser having a housing of a regular shape.

It should be understood that other embodiments are contemplated, including embodiments with additional, fewer or alternative features and different combinations of the features shown and/or described.

Prior to describing the present invention in detail, the following terms are defined for clarity. Terms not defined should be given their ordinary meaning as understood by a skilled person in the relevant art.

"Elevated position" as used herein, refers to a position of a volatile composition dispensing system according to the present invention wherein a volatile composition dispenser is above an interior surface in an interior environment.

"Vertical orientation" as used herein, refers to a position of a volatile composition dispensing system according to the present invention wherein a volatile material in the volatile composition dispenser is facing the environment in a forward facing or in a rear facing position.

"Membrane" as used herein, refers to a semi-permeable material which allows some components of matter to pass through but stops other components. Of the components that pass through, the membrane moderates the permeation of components i.e. some components permeate faster than other components. Such components may include molecules, ions or particles.

"Microporous membrane" as used herein, refers to a material having a network of pores.

"Non-energized" as used herein, means that the apparatus is passive and does not require to be powered by a source of external energy. In particular, the apparatus does not need to be powered by a source of heat, gas, or electrical current, and the volatile composition is not delivered by aerosol means. Further, as used in this specification and the appended claims, the singular forms "a", "an", and "the" include plural references unless the content clearly dictates otherwise.

"Volatile material" or "Volatile composition" as used herein, refers to a composition or a material that is vaporizable at room temperature and atmospheric pressure without the need of an energy source. The volatile material may be a composition comprises entirely of a single volatile material or entirely of a volatile material mixture (i.e. the mixture has more than one volatile component). Further, it is not necessary for all of the component materials of the composition to be volatile. Any suitable volatile material in any amount or form, including a liquid, solid, or emulsion, may be used. Materials suitable for use herein may include non-volatile compounds, such as carrier materials (e.g., water, solvents, etc.). It should also be understood that when the volatile material is described herein as being "delivered", "emitted", or "released", this refers to the volatilization of the volatile component thereof and does not require that the non-volatile components thereof be emitted. For the purposes of illustrating the present invention in detail, the invention is described below as a hook for a non-energized volatile composition dispenser having an irregular shape. However, the hook may be configured for use with a volatile composition dispenser with a regular shape.

Figure 1:
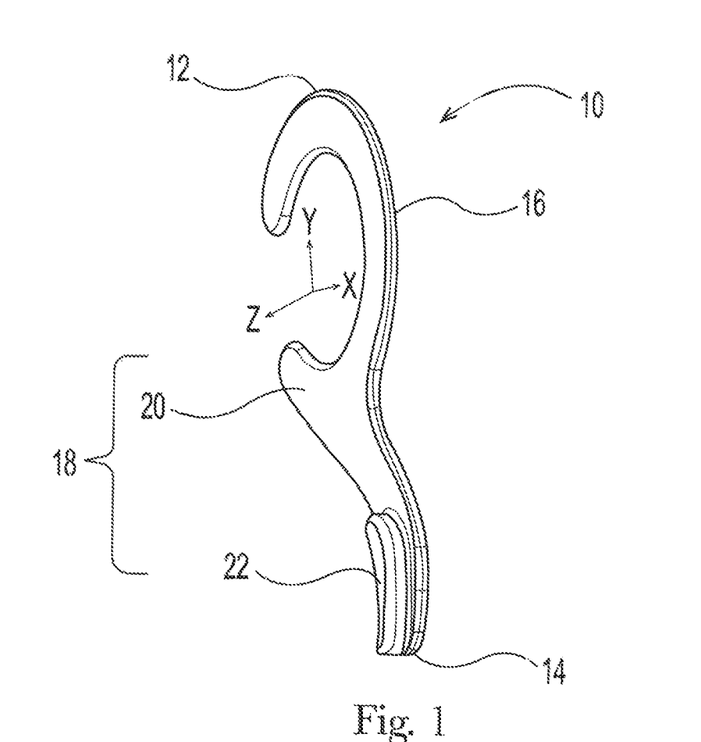
FIG. 1 is a front perspective view of a hook for a volatile composition dispenser according to the present invention.

FIG. 1 is a front perspective view of a hook 10 for a volatile composition dispenser 1 according to the present invention. FIG. 2 is a rear perspective view of the volatile composition dispenser 1.

Referring to FIG. 1, the hook 10 comprises a width, length and depth along an x-axis, y-axis, and z-axis, respectively. The hook 10 has a top end 12, a bottom end 14 and a mounting portion 16 at the top end 12 for mounting the volatile composition dispenser 1 to a support in an interior space. The hook 10 comprises a body portion 18 extending from the mounting portion 16 to the bottom end 14. The body portion 18 comprises a gripping portion 20 and an aperture engaging portion 22 adapted for releasably engaging at least one aperture 4 in a housing 2 of the dispenser 1.

Figure 9:
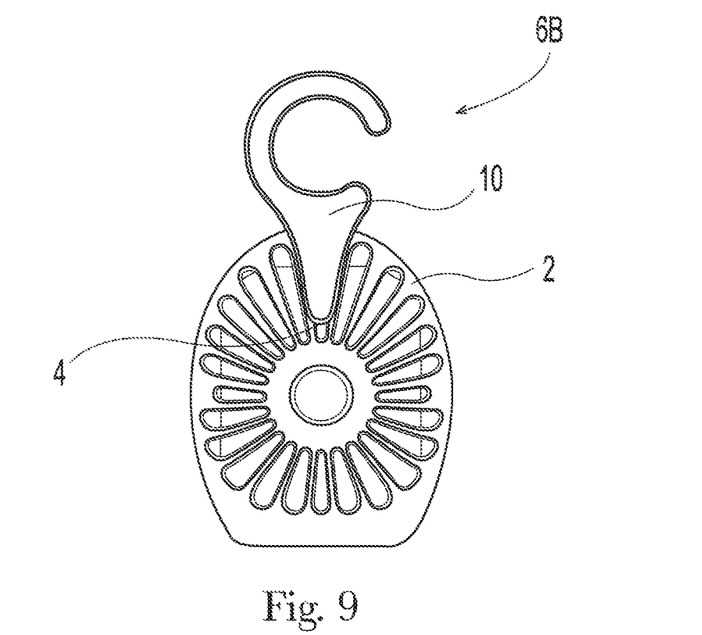
FIG. 9 is a rear view of the volatile composition dispensing system of FIG. 8 after assembly.

Referring to FIG. 2, the housing 2 may comprise a front cover 5 and a rear frame 6 and the at least one aperture 4 may be centrally located in the rear frame 6. The rear frame 6 comprises a rear frame exterior surface 7. The at least one aperture 4 comprises an aperture inner wall extending from the rear frame exterior surface 7 into an interior of the housing. The at least one aperture 4 may comprise an aperture first end 41 proximal to a housing top 3, and an aperture second end 42 distal to the housing top 4. The at least one aperture 4 may be one of a plurality of apertures 60 that are within the rear frame 6 proximal to the housing top 3. The plurality of apertures 60 are configured for air flow through the housing 2 and out through the apertures 60 for dispensing a volatile material from the volatile composition dispenser 1 once the dispenser 1 is activated. Having the hook 10 designed for attaching to at least one aperture 4 being one of the apertures 60 configured for air flow is that the at least aperture 4 serves a dual function of receiving and attaching the hook 10 thereto when the volatile composition dispenser 1 is in a hanging configuration, such as shown in FIG. 9, and as an air flow opening/vent for convective movement of air flow through the housing 2 when the volatile composition dispenser 1 is in a standing configuration, such as FIG. 2.

Figure 3:
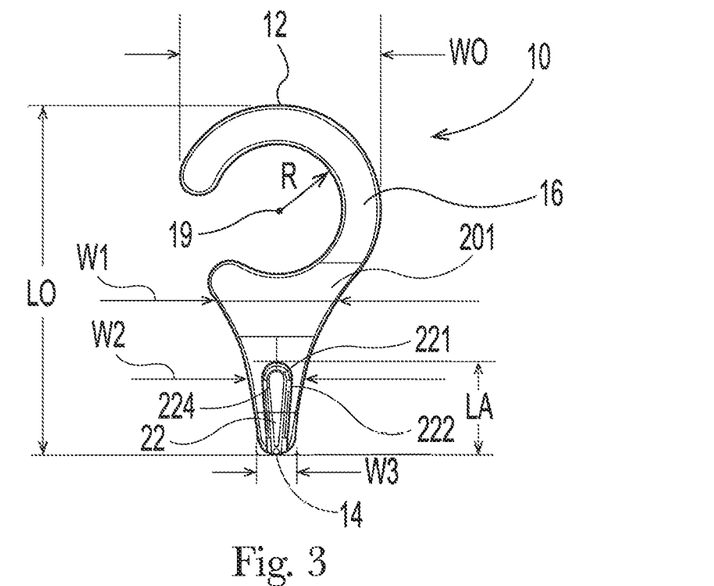
FIG. 3 is a front view of the hook of FIG. 1.
Figure 4:
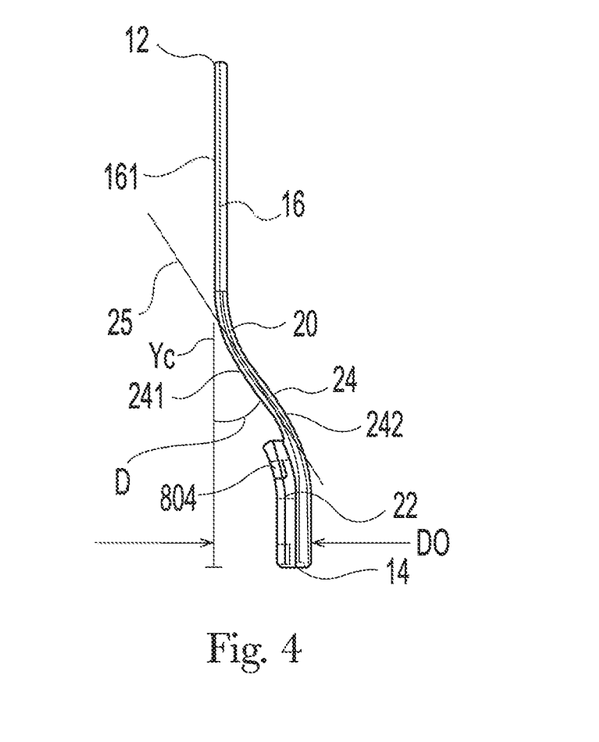
FIG. 4 is a side view of the hook of FIG. 1.

FIG. 3 is a front view of the hook 10 illustrating a shape of the hook 10 and a geometry of the body portion 18. FIG. 4 is a side view of the hook 10 of FIG. 3. The hook 10 may be of different shapes. A preferred shape, however, is a shape similar to the shape of the at least one aperture 4 of the housing 2. A technical effect of having the shape of the hook 10 corresponding to the shape of the at least one aperture 4 is to provide a visual association to identify the hook 10 with a feature of the housing 2 that the hook 10 is designed to be used with. In particular, the aspect ratio of the hook 10 may be similar to or substantially the same as the aspect ratio of the at least one aperture 4.

As shown in FIGS. 3 and 4, the hook 10 comprises a length L0 between the top end 12 and the bottom end 14 along the y-axis and a width W0 along the x-axis, and a depth D0 along the z-axis, wherein the length L0, width W0 and depth D0 define a volume of space occupied by the hook 10 in a package. The width W0, length L0 and depth D0 may be configured such that the hook 10 is considered compact and/or portable. By "compact" or "portable", it is meant that the hook 10 can be conveniently packaged with a volatile composition dispenser 1 in a package for display and sale in a store. Referring to FIG. 4, the hook 10 further comprises a center longitudinal axis Yc extending along the length L0 of the hook 10 between the top end 12 and the bottom end 14 of the hook 10 and a plane 161 comprising the center longitudinal axis Yc.

The hook 10 may comprise an aspect ratio that denotes the ratio of the width W0 to the length L0 of the hook 10. The hook 10 may comprise an aspect ratio of W0:L0 of at least about 1:2. In other embodiments, this aspect ratio may be at least about 1:3, 1:4, 1:5, or even 1:6. The hook 10 may comprise a length L0 of from 40 mm to 100 mm, from 50 mm to 90 mm, from 60 mm to 80 mm or different combinations of any numerical values in the ranges listed above. The hook 10 may comprise a width W0 of from 20 mm to 50 mm, from 25 mm to 45 mm, or different combinations of any numerical values in the ranges listed above. The hook 10 may comprise a depth D0 of from 3 mm to 20 mm, from 5 mm to 17 mm, from 10 mm to 15 mm or different combinations of any numerical values in the ranges listed above. In an exemplary embodiment, the hook 10 may comprise a length L0 of 70 mm, a width W0 of 40 mm and a depth D0 of 13 mm.

Referring to FIG. 3, the mounting portion 16 of the hook 10 may be configured in different ways to be mounted to or attached to a support. The mounting portion 16 may comprise an inner surface 17 having a center point 19 wherein the inner surface 17 is shaped and sized based on a corresponding size and shape of a cross-section of a support to which the hook 10 is supported or mounted to. For example, if the support has a circular cross section (such as a support 110 of FIG. 9), the inner surface 17 may be rounded to form a smooth curve having a hook radius R relative to the center point 19 for mounting to the support.

Further, the body portion 18 is characterized by a first width W1 at the gripping portion 20, and a second width W2 at the aperture engaging portion 22, wherein a ratio of the first width W1 to the second width W2 is greater than 1.5:1. The first width W1 of the body portion 18 may be determined at any location between an first adjoining portion or joinder of the gripping portion 20 and the mounting portion 16 a second adjoining portion or joinder of the gripping portion 20 and the aperture engaging portion 22 in a X axis of the hook 10 as shown in FIG. 3. The second width W2 of the body portion 18 may be determined at any location between the second adjoining portion or joinder of the gripping portion 20 and the aperture engaging portion 22 to the bottom end 14 of the hook 10. The ratio of the first width W1 to the second width W2 may be from 1.1 to 4:1, from 1.2:1 to 3.5:1, or from 1.5:1 to 3:1. The body portion 18 may be characterized by a first width W1 of 16 mm to 40 mm, from 20 mm to 35 mm, or different combinations of any numerical values in the ranges listed above, at the gripping portion 20. The second width W2 at the aperture engaging portion 22 may be from 8 mm to 15 mm, from 10 mm to 14 mm or different combinations of any numerical values in the ranges listed above. A technical effect of the hook 10 having the ratio of the first width W1 to the second width W2 (at the aperture engaging portion 22) of greater than 1.5:1 is that it provides a larger area of contact for gripping thereby enabling ease of applying a pressure or force to the hook for release of the hook 10 from the volatile composition dispenser 1. The body portion 18 may further comprise a third width W3 at a distal end 23 of the aperture engaging portion 22. The body portion 18 may comprise a non-uniform width to define a tapered shape such that the second width W2 is less than the first width W1, and the third width W3 is less than the second width W2. Specifically, the third width W3 may correspond to a width of the aperture engaging portion 22 at the bottom end 14.

Referring to FIG. 3, the aperture engaging portion 22 may comprise a length LA along the y axis of 5 mm to 30 mm, from 10 mm to 25 mm, from 15 mm to 20 mm or different combinations of any numerical values in the ranges listed above. The hook 10 may be characterized by a ratio of the length of the hook 10 to the length of the aperture engaging portion 22 (L0:LA) of greater than or equal to 1. A technical benefit of the geometry of the body portion having the ratio of L0:LA is that when the hook is detached by a user from the dispenser aperture because there is a lever effect to provide user with a grip at the gripping portion having the first width W1 and the width of the body portion at the aperture engaging portion having a smaller second width W2. As there is a mechanical advantage and the user can use a lower force to release the hook, this minimizes accidental damage to the hook and enables reuse of the hook after first use with a first volatile composition dispenser.

The aperture engaging portion 22 may comprise a shape substantially the same as a shape of the at least one aperture 4. A technical effect of having substantially the same shape for the aperture engaging portion 22 and the at least one aperture 4 is that it provides a visual cue to users that is indicative of a location to attach the hook 10 to the housing 2 with minimal or no usage instructions. The aperture engaging portion 22 may also be characterized by dimensions configured to enable releasable engagement of the aperture engaging portion 22 with the at least one aperture 4.

The aperture engaging portion 22 may comprise a protrusion 221 configured to form an interference fit or frictional fit between the at least one aperture 4. In an exemplary example, where the at least one aperture 4 and the aperture engaging portion 22 have axis-symmetrical profiles (such as shown in FIG. 1 and FIG. 2), the protrusion 221 may comprise at least one resilient side wall 222 configured as a ring-shapes structure to define an annular snap joint for releasably engaging the at least one aperture 4 in the housing 2 of said dispenser 1. The hook 10 may be made of a thermoplastic material characterized by an Elastic Modulus of 0.9 to 1.1 GPa, preferably the material may comprise polyester, polypropylene or the like. The aperture engaging portion 22 may be made of a same material as the hook 10 or be made of a combination of two different thermoplastic materials, i.e. a first thermoplastic material and a second thermoplastic material having different hardness durometer characteristics from the first thermoplastic material. While an injection molded construction of the hook 10 using the same thermoplastic material is preferred, the hook 10 may comprise a second thermoplastic material such as a suitable deformable thermoplastic material, for example TPE. In particular, the aperture engaging portion 22 may comprise TPE formed in a thin layer and attached to the at least one resilient side wall 222 with an appropriate adhesive or by other means to enable releasable engagement with the at least one aperture 4.

Referring to FIG. 4, the body portion 18 may further comprise a housing engaging part 24 disposed between the gripping portion 20 and the aperture engaging portion 22. A technical effect of the hook 10 having a housing engaging part 24 is to be in contact with a portion of the housing 2 so that the hook 10 and the housing 2 form a unitary object with a center of gravity C.G. that lies in a vertical plane wherein the C.G. is aligned with a support point on the mounting portion 16 of the hook 10 as shown in FIG. 9 described hereinafter.

Referring to FIG. 4, the housing engaging part 24 may comprise an engaging surface 241 configured for contacting at least a part of an exterior of the housing 2 and a rear surface 242, wherein the engaging surface 241 and the rear surface 242 define a thickness of the housing engaging part 24. The housing engaging surface 241 may be configured in various ways according to a shape of the housing 2. In particular, the engaging surface 241 and the rear surface 242 of the housing engaging part 24 may be formed upon the same curve as the rear frame 6 of the housing 2. Specifically, the engaging surface 241 may comprise a curved profile corresponding to a curved shape of the rear frame 6. If the housing 2 has an irregular or asymmetric shape such as shown in FIG. 2, the hook 10 may be configured such that the gripping portion 20 and the housing engaging part 24 may lie in a plane 25 inclined relative to the mounting portion 16 or the plane 161 to define an inclined part of the body portion 18 as shown in FIG. 4. In particular, the mounting portion 16 lies in the plane 161 comprising the center longitudinal axis. Referring to FIG. 4, the inclined part may be characterized by an angle (θ) from 10 degrees to 90 degrees, from 20 to 80 degrees, or from 25 to 75 degrees.

However, if for example, the housing 2 is a regular body mass having a regular shape such as a cuboid with a planar exterior, the engagement surface 241 may lie in a plane parallel to the planar exterior of the housing.

Figure 5:
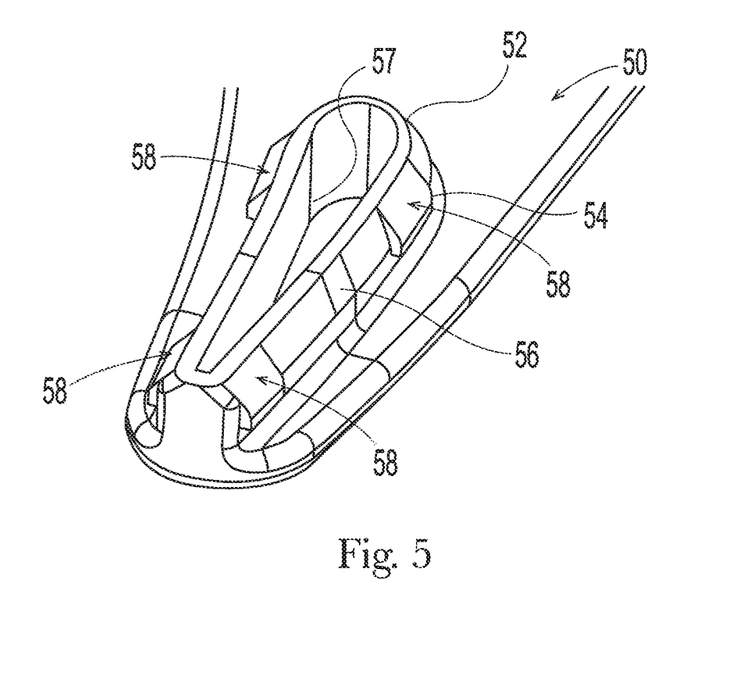
FIG. 5 is a partial perspective view of a different design of a hook having an aperture engaging portion according to the present invention.

FIG. 5 is a partial perspective view of a different design of a hook 50 having an aperture engaging portion 52 according to the present invention. The hook 50 has substantially the same features of the hook 10 of FIG. 1 and differs in the design of the aperture engaging portion 52 described hereinafter.

In particular, the aperture engaging portion 52 may comprise a base part and at least one resilient side wall extending from the base part defining a resilient annular member 56 and a hollow center part 57. A plurality of projections 54 is disposed circumferentially on the resilient annular member 56 to define a plurality of snap fits for engaging at least one aperture of the housing. Each of at least two of the projections 54 may extend outwardly from an opposing side of the resilient annular member 56. Each projection 54 may comprise a projection engaging surface, such as a chamfer 58 configured for engaging with a periphery of the at least one aperture to resist against free movement of the hook 10 when the hook 10 is attached to the housing. A technical effect of having the chamfer 58 on the projections 54 positioned circumferentially on the resilient annular member 56 is to enable ease of insertion of the aperture engaging portion 52 into at least one aperture 64 as illustrated in FIG. 6.

Figure 6:
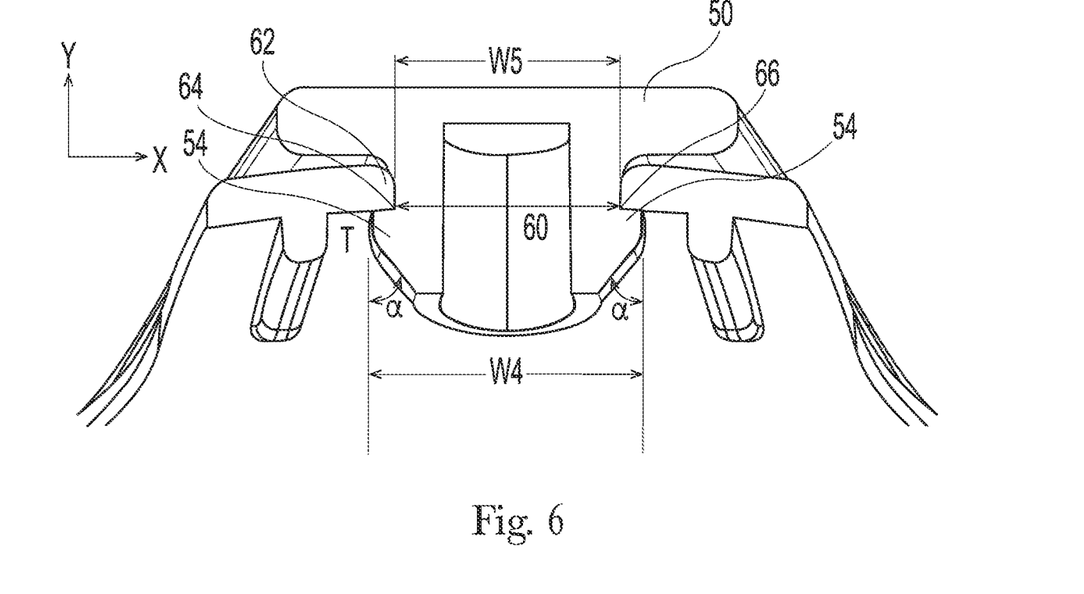
FIG. 6 is a partial section view of the hook 50 attached to a volatile composition dispenser having a housing with at least one aperture.

FIG. 6 is a partial section view of the hook 50 attached to a volatile composition dispenser having a housing with at least one aperture 60. The at least one aperture 60 comprises a periphery defined by a resilient aperture side wall 62. Referring to FIG. 6, a ratio of a width W4 between the tip T of each of the projections 54 of the aperture engaging portion 52 extending from one to the opposite in a X direction to a width W5 of opposing engagement locations 64, 66 on the resilient aperture side wall 62 in the X direction, W4:W5, may be greater than 1. A technical effect of having the ratio greater than 1 is to ensure that the aperture engaging portion 52 securely engages the at least one aperture 60 of the housing and is not easily detachable from the housing, and in the absence of a force applied on the body portion of the hook. The chamfer 58 may be characterized by a lead and corresponding return angle, a of from 30 to 45 degrees for ease of assembly/disassembly of the aperture engaging portion 52.

Figure 7:
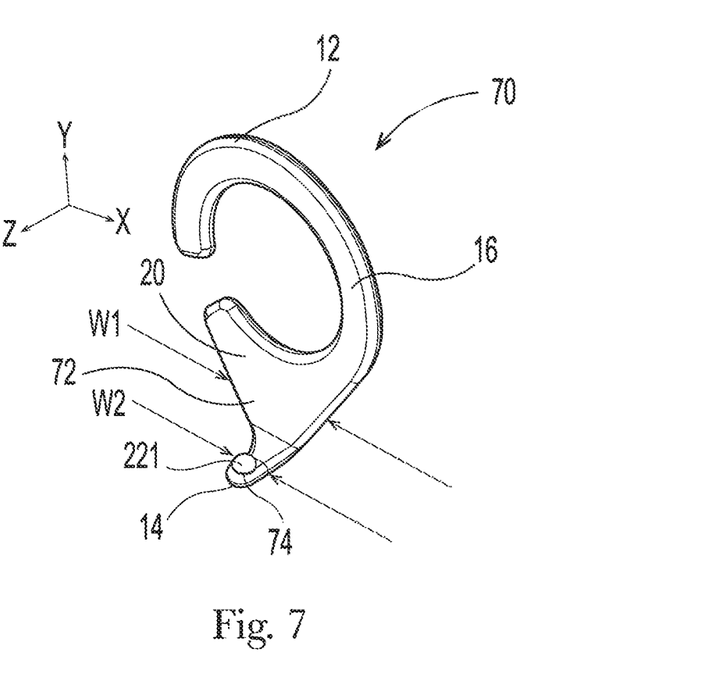
FIG. 7 is a front perspective view of an alternative design of a hook according to the present invention.

FIG. 7 is a front perspective view of a different design of a hook 70 according to the present invention. The hook 70 comprises substantially the same features as the hook 10 of FIG. 1 in that the hook 70 comprises a mounting portion 16, a gripping portion 20 and an aperture engaging portion 22. The difference between the hook 10 and the hook 70 is that the hook 70 comprises a planar housing engagement surface 72 different from a inclined profile of the housing engagement surface 241 of the hook 10 as shown in FIG. 4. The hook 70 also differs from the hook 10 in that the hook 70 includes an aperture engaging portion 74 comprising a single protrusion 221 configured for releasably engaging at least one aperture of a housing of a volatile composition dispenser (not shown). A technical effect of a planar housing engagement surface 72 is to engage a housing (not shown) of a cuboid shape having a planar housing surface with an aperture disposed in the planar housing surface for engaging the protrusion 221. Specifically, the protrusion 221 may be a solid structure having a spherical shape located at a distal end 14 of the hook 70. A size and shape of the protrusion 221 may be configured for a housing having limited exterior surface area for forming an aperture, and the planar housing engagement surface 72 may be configured to lie in a plane parallel to the planar exterior of the housing. Accordingly, the hook 70 may be configured accordingly to engage and maintain the housing in a substantially vertical and/or upright position.

The hook 10, 50, 70 according to the present invention may be made of a thermoplastic material characterized by an Elastic Modulus of 0.9 to 1.1 GPa, preferably the material may comprise polyester, polypropylene or the like. The thermoplastic material may be translucent. The hook 10, 50, 70 may be made of a same material as the housing 2. The hook 10, 50, 70 and the housing 2 can also be injection molded with the same material to reduce material stock variation and simplify manufacturing.

Volatile Dispensing System

Figure 8:
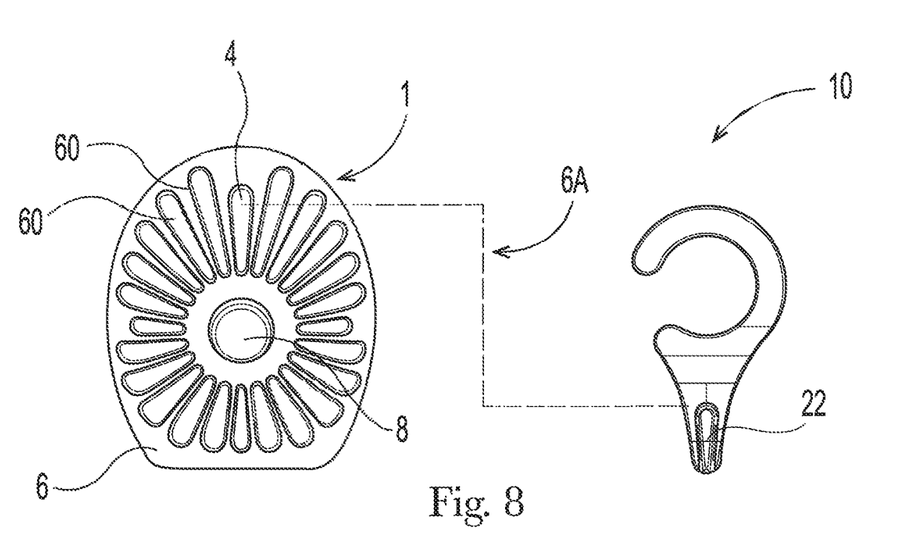
FIG. 8 is a perspective view of a volatile composition dispensing system having a volatile composition dispenser and a hook according to the present invention before assembly.

To explain the way the hook 10 works in a volatile composition dispensing system according to the present invention, it is helpful to understand how the hook 10 is assembled to the housing 2 of the dispenser 1. A method of assembling a hook to a volatile composition dispenser according to the present invention is described with reference to FIGS. 8, 9 and 10. Specifically, the present invention relates to a method of assembling a hook to a volatile composition dispenser, the method comprising:

providing a volatile composition dispenser 1 comprising a housing 2, wherein the housing 2 comprises at least one aperture 4;

providing a hook 10;

aligning the hook 10 with the at least one aperture 4 of the housing 2; and pressing the hook 10 in the at least one aperture 4 to assemble the hook 10 to the dispenser 1.

A volatile material (not shown) may be comprised in a dispenser 1 as shown in the above figures according to the present invention. For illustrative purposes, the volatile material may be described as a liquid volatile composition for air freshening. However, it will be appreciated that the volatile material may be a solid or gel composition.

FIG. 8 illustrates components of a volatile composition dispensing system 100 before assembly. Specifically, the volatile composition dispensing system 100 comprises the hook 10 and the dispenser 1. FIG. 8 also shows a first step 6A of the method in which the aperture engaging portion 22 is aligned with the at least one aperture 4 of the housing 2. The at least one aperture 4 is one of a plurality of apertures disposed in the housing 2, and is centrally located next to the top of the housing 2 so that the dispenser 1 is maintained in a substantially vertical position upon mounting to a fitting in an interior space for vaporizing a volatile material from the dispenser 1. For ease of identifying the correct aperture for attaching the hook 10 to the dispenser 1, a shape of the aperture engaging portion 22 may be designed to correspond to a profile of the at least one aperture 4. Although the aperture engaging portion 22 described hereinbefore and in the figures is of an elliptical shape corresponding approximately to the size and shape of the at least one aperture 4, it will be appreciated that the aperture engaging portion 22 can be sized and configured to fit a number of different sizes and types of apertures of the housing so as to allow each change over to different housing designs during production of volatile composition dispensers 1.

For example, apertures 60 in the plurality of apertures 60 may be configured to have a different size and/or shape from the at least one aperture 4 so that the user attaches the hook 10 to the intended location, i.e. the at least one aperture 4.

FIG. 9 illustrates second step 6B of the method in which the hook 10 is attached to the housing 2. Specifically, when the aperture engaging portion 22 is aligned and engages with the at least one aperture 4, the hook 10 is press-fit into the at least one aperture 4 and is attached to the housing 2. As the hook 10 is designed for blind assembly, i.e. the aperture engaging portion 22 is facing away from the user during attachment, the aperture engaging portion 22 may be designed to generate an auditory feedback such as a "click" sound to indicate to the user that the hook 10 is securely attached.

Figure 10:
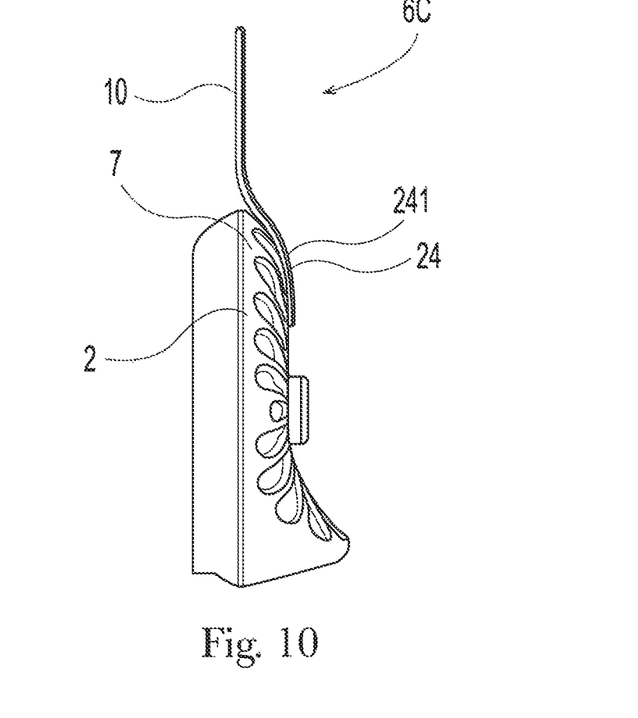
FIG. 10 is a side view of the volatile composition dispensing system of FIG. 9.

FIG. 10 illustrates a third step 6C of the method in which the hook 10 is attached to the housing 2. When the hook 10 is attached to the dispenser 1 to define the volatile dispensing system 100, the engagement surface 241 contacts the rear frame exterior surface 7 of the rear frame 6 such that a gap between the engagement surface 241 and the rear frame exterior surface 7 is minimized or there is no gap. It will be noted that the housing engaging part 24 is formed in the same plane as the rear frame 6 of the housing 2, whereby when the hook 10 is attached to the housing 2 and the volatile composition dispenser 2 is inclined to lean in a downward position away from a vertical position due to a weight of the volatile composition dispenser 1, the housing engaging part 24 contacting the housing 2 will act as a stop to positively limit the downward position.

Figure 11:
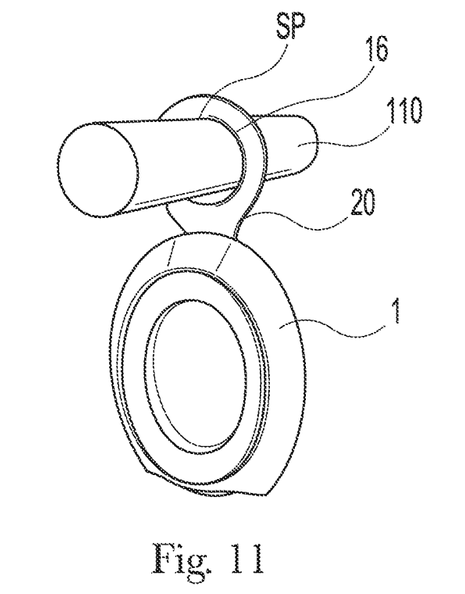
FIG. 11 is a front perspective view of the volatile composition dispensing system of FIG. 9 in which the hook is supported on a fitting in an interior space and suspended above an interior surface in an interior space.
Figure 12:
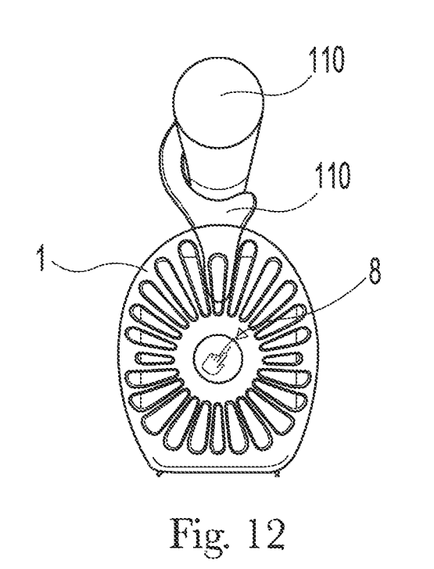
FIG. 12 is a rear perspective view of the volatile composition dispensing system of FIG. 9.

A technical effect of minimizing the gap is that the hook 10 and the dispenser 1 form a unitary structure with a center of gravity C.G. that is along an imaginary vertical line and directly below a support point SP of suspension of the dispenser 1 as shown in FIG. 11. Advantageously, this minimizes the dispenser 1 from pivoting about the SP when the hook 10 is supported on a fitting in an interior space. As a result, tilting of the dispenser 1 is minimized and the dispenser 1 can be maintained in a substantially upright position such as shown in FIG. 11 and FIG. 12.

The dispenser 1 may be activated before or after attaching the hook 10 by pressing a push button 8 located in the rear frame 6 of the housing 2 to rupture a non-permeable foil substrate in a volatile composition cartridge. The dispenser 1 may also be activated by other means such as for example by peeling a non-permeable foil substrate covering a volatile composition disposed in the housing.

Method of Delivering a Volatile Composition

FIG. 11 is a front perspective view of the volatile composition dispensing system 100 of FIG. 8 in which the hook 10 is mounted on a support 110 in an interior space and suspended above an interior surface in the interior space. The interior surface may be a table-top surface, a floor surface or any surface in the interior. FIG. 12 is a rear perspective view of the volatile composition dispensing system 100.

In particular, it will be appreciated that volatile compositions have been provided in volatile composition dispensers such as air fresheners and/or deodorizers which are placed on wet surfaces in a bathroom or toilet or a sanitary space to freshen the air in the space. Often, a bottom surface of the air freshener is in contact with the wet surface and as a result the bottom surface may get wet and dirty.

The present invention relates to a method of delivering a volatile composition in an interior space that can keep surfaces of the volatile composition dispenser dry. The method comprises providing a volatile composition dispenser 1 comprising a housing 2 and a volatile composition disposed in the housing 2, wherein the housing 2 comprises at least one aperture 4;

providing a hook 10;

attaching the hook 10 to the at least one aperture 4 of the housing 2; and mounting the hook 10 on a support 110 in the interior space for suspending the dispenser 1 above a surface in the interior space for delivering the volatile composition in the interior space.

An advantage of suspending the dispenser above the surface is that the housing 2 and any surface of the housing 2 is in an elevated position relative to a surface in the interior surface, and therefore can be kept away from wet surfaces in the interior space and therefore be kept in a dry and clean condition.

Method of Disassembly

The present invention also relates to a method of disassembly of a hook according to the present invention from a volatile composition dispenser after the volatile composition in the dispenser 1 have evaporated and is used up. Specifically, the hook 10 is releasable from the dispenser 1 so as to be re-used for a new dispenser.

Figure 13:
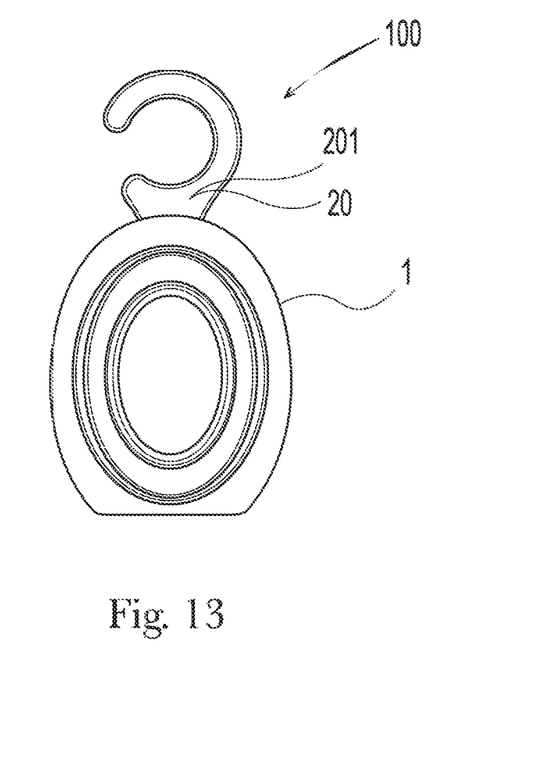
FIG. 13 is a front perspective view of the volatile composition dispensing system of FIG. 9.

To facilitate release of the hook 10 from the dispenser 1, the gripping portion 20 of the hook 10 is sized and shaped to be visually detectable to the user from a front or rear side of the dispenser 1 after the hook 10 is attached to the dispenser 1 such as shown in FIG. 13. Upon pressing on the gripping portion 20, the hook 10 is releasable from the dispenser 1 in a single hand action thereby minimizing the inconvenience of using a separate tool to remove the hook 10. The hook 10 may be engaged to a new volatile composition dispenser in the same way with structural features as shown in the hook 10 of FIG. 1, and therefore the features are not further described. The gripping portion 20 may comprise a finger support 201 having grip bumps (not shown) disposed on the finger support 201 for better grip. The finger support 201 may comprise a surface area configured to enable users to have a grip between the thumb and finger tips for pulling or pressing the hook 10 to the dispenser. Alternatively, the gripping portion 20 may be textured to increase friction between the fingers to aid release of the hook 10 from the dispenser 1. Accordingly, a hook according to the present invention provides consumers with a solution for suspending a volatile composition dispenser in which the hook is supported on a fitting in an interior space and the dispenser is suspended above an interior surface in an interior space while having a function of releasably detached from the dispenser after the volatile composition is used up thereby increasing material reuse and reducing the need to buy a new hook for hanging a new volatile composition dispenser.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A volatile composition dispensing system comprising:
   a volatile composition dispenser, wherein the volatile composition dispenser comprises a housing comprising at least one aperture, wherein the housing is configured for containing a volatile composition; and
   a hook for the volatile composition dispenser, the hook comprising:
     a center longitudinal axis extending along a length of the hook (L0) between a top end and a bottom end of the hook;
     a plane comprising the center longitudinal axis;
     a mounting portion at the top end for mounting the hook to a support in an interior space; and
     a body portion extending from the mounting portion to the bottom end; wherein the body portion comprises a gripping portion and an aperture engaging portion adapted for releasably engaging at least one aperture in a housing of the volatile composition dispenser;
     wherein the body portion is characterized by a first width at the gripping portion and a second width at the aperture engaging portion, wherein a ratio of the first width to the second width is greater than 1.5:1,
   wherein the system comprises a volatile composition cartridge, wherein the cartridge comprises a membrane located on an exterior of the cartridge; wherein the aperture engaging portion is positioned at least partially within the at least one aperture to be spaced apart from an evaporative surface area of the membrane upon attaching the hook to the at least one aperture.

2. The system of claim 1, wherein the volatile composition is selected from the group consisting of: an air freshening composition, a fabric freshening composition, a fragrance, odor masker, medicine, disinfectant, deodorizer, insect repellant, aromatherapy material, and mixtures thereof.

3. The system of claim 1, wherein the hook is characterized by a ratio of the length of the hook (L0) to a length of the aperture engaging portion (LA), and wherein L0:LA is greater than or equal to 1.

4. The system of claim 1, wherein at least a part of the mounting portion is parallel to or lies in the plane comprising the center longitudinal axis.

5. The system of claim 4, wherein the body portion further comprises a housing engaging part having an engagement surface configured for contacting at least a part of an exterior of the housing, wherein the housing engaging part is disposed between the gripping portion and the aperture engaging portion.

6. The system of claim 5, wherein the engagement surface lies in the plane comprising the center longitudinal axis.

7. The system of claim 5, wherein the engagement surface is inclined at an angle ($\theta$) from 10 degrees to 90 degrees relative to the plane comprising the center longitudinal axis to define an inclined part of the body portion.

8. The system of claim 7, wherein the angle ($\theta$) is from 20 to 80 degrees.

9. The system of claim 7, wherein the angle ($\theta$) is from 25 to 75 degrees.

10. The system of claim 1, wherein a shape of the aperture engaging portion corresponds to a profile of the at least one aperture.

11. The system of claim 1, wherein the aperture engaging portion comprises a protrusion configured for releasably engaging the at least one aperture in the housing of said dispenser.

12. The system of claim 11, wherein the protrusion comprises at least one resilient side wall.

13. The system of claim 12, wherein the aperture engaging portion comprises a plurality of projections disposed circumferentially on the at least one resilient side wall configured for releasably engaging a periphery surrounding the at least one aperture in the housing of said dispenser.

14. The system of claim 1, wherein the hook is made of a thermoplastic material characterized by an Elastic Modulus of 0.9 to 1.1 GPa.

15. A method of assembling the system according to claim 1, the method comprising:
   aligning the hook with the at least one aperture of the housing; and
   pressing the hook in the at least one aperture to assemble the hook to the volatile composition dispenser.

16. A method of disassembly of the system according to claim 1, the method comprising:
   providing the volatile composition dispenser, wherein the hook is attached to the at least one aperture, wherein the volatile composition dispenser is substantially free of the volatile composition; and
   applying a pressure to the gripping portion or the mounting portion of the hook to release the hook from the dispenser in a single hand action.

* * * * *